United States Patent Office 3,352,854
Patented Nov. 14, 1967

3,352,854
STEROID DERIVATIVES
Patrick A. Diassi, Westfield, and Gerald W. Krakower,
Elizabeth, N.J., assignors, by mesne assignments, to
E. R. Squibb & Sons, Inc., New York, N.Y., a corporation of Delaware
No Drawing. Filed May 11, 1965, Ser. No. 455,002
25 Claims. (Cl. 260—239.55)

ABSTRACT OF THE DISCLOSURE

This invention relates to fusidic acid derivatives of the formula

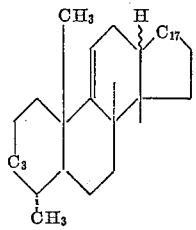

wherein $C_3$ is selected from the group consisting of C=O,

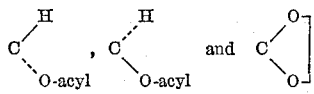

and $C_{17}$ is selected from the group consisting of C=O and

and intermediates utilized in the preparation thereof. The compounds of this invention possess androgenic activity.

---

This invention relates to and has as its object the provision of new physiologically active steroids, novel methods for their production and new intermediates useful in said preparation. More particularly, this invention relates to steroid derivatives represented by the formula

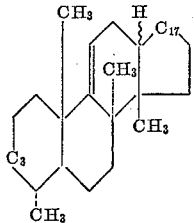

wherein $C_3$ is —C=O,

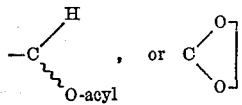

and $C_{17}$ is C=O, or

The preferred acyl radicals are those of hydrocarbon carboxylic acids of less than twelve carbon atoms, as exemplified by the lower alkanoic acids (e.g., acetic, propionic, butyric and tertpentanoic acids), the lower alkenoic acids, the monocyclic aryl carboxylic acids (e.g., benzoic and toluic acids), the monocyclic aryl lower alkanoic acids (e.g., phenacetic and β-phenylpropionic acids), the cycloalkane carboxylic acids and the cycloalkene carboxylic acids.

The novel compounds of this invention are pharmacologically active substances that possess anti-androgenic activity (i.e., they can be utilized in the treatment of such conditions as hyperandrogenic acne). They are also useful as anti-estrogenic and anti-gonadotrophic agents.

The compounds may be formulated for such administration, the concentration and/or dosage being based on the activity of the particular compound and the requirements of the patient.

Some of the final products of this invention are prepared by the process of this invention which entails a number of steps beginning with 4α,8,14-trimethyl-18-nor-5α,8α,9β,14β-androstane-3,11,17-trione as starting material. This starting compound may be prepared by deactoxylating and epimerizing 4α,8,14-trimethyl-16β-hydroxy-18-nor - 5α,8α,9β,13α,14β - androstane - 3,11,17-trione 16-acetate by refluxing this compound in the presence of glacial acetic acid and zinc dust.

In the first step of the novel process of this invention, the starting material is ketalized as by treatment with ethylene glycol in an acid medium at elevated temperatures (e.g., under reflux conditions) to yield a mixture of 3,17-bisethylenedioxy-4α,8,14-trimethyl-18-nor - 5α,8α,9β, 14β-androstane-11-one and 3,11,17-trisethylenedioxy-4α, 8,14-trimethyl-18-nor-5α,8α,9β,13α,14β-androstane. It is to be understood that propylenedioxy derivatives may also be obtained when propylene glycols such as 1,3-propylene glycol or 1,2-propyleneglycol are utilized in lieu of ethylene glycol in the ketalization processes of the invention. The mixture of these androstanes may be separated by fractional crystallization or chromatographic separation.

The compound 3,17-bisethylenedioxy-4α,8,14-trimethyl-18-nor-5α,8α,9β,14β-androstane-11-one may then be reduced as by treatment with lithium aluminum hydride to yield the new intermediate 3,17-bisethylenedioxy-11α-hydroxy-4α,8,14-trimethyl-18 - nor - 5α,8α,9β,14β - androstane. Further, a new intermediate 4α,8,14-trimethyl-11α-hydroxy-18-nor-5α,8α,9β,14β-androstan-3,17 - dione may be prepared by hydrolysis of 3,17-bisethylenedioxy-11α-hydroxy-4α,8,14-trimethyl-18 - nor - 5α,8α,9β,14β-androstane with a weak carboxylic acid (e.g., acetic acid).

This new 3,17-dione intermediate may then be dehydrated in the presence of an aromatic base and an inorganic acid chloride such as pyridine and thionyl chloride at a temperature of from —5 to 15° C. to form a $\Delta^{9(11)}$ compound of this invention, 4α,8,14-trimethyl-18-nor-5α,8α,14β-androst-9(11)-ene-3,17-dione. The bisketal of this $\Delta^{9(11)}$ compound may also be prepared by dehydrating the new 3,17-bisketal androstane of the invention in a similar manner. Thus, 3,17-bisethylenedioxy-11α-hydroxy-4α,8,14-trimethyl-18 - nor - 5α,8α,9β,14β-androstane may be dehydrated to form the corresponding 3,17-bisethylenedioxy-4α,8,14-trimethyl - 18 - nor - 5α,8α,14β-androst-9(11)-ene. Hydrolysis of this latter intermediate will also give the aforementioned compound of this invention, 4α,8,14-trimethyl-18-nor-5α,8α,14β - androst - 9(11)-ene-3,17-dione.

Utilizing the same procedures set forth hereinabove and starting with 4α,8,14-trimethyl-18-nor-5α,8α,14β - androstane-3,11,17-trione as the starting material, the preparation of which is disclosed in U.S. patent application Ser. No. 399,339, filed Sept. 25, 1964 now abandoned, in lieu of 4α,8,14-trimethyl-18-nor - 5α,8α,9β,14β - androstane-3,11,17-trione, 4α,8,14-trimethyl-18-nor-5α,8α,14β-androst-9(11)-en-3,17-dione is again obtained as an end product. In addition, the corresponding 9α intermediates are also formed in this procedure. Intermediates which are formed are 3,17-bisethylenedioxy-4α,8,14-trimethyl-18-nor-5α,8α,14β-androstane-11-one; 3,17 - bisethylenedioxy - 11β - hydroxy-4α,8,14-trimethyl-18-nor-5α,8α,14β - androstane; 3,17-bisethylenedioxy-4α,8,14-trimethyl-18-nor - 5α,8α,14β-androst-9(11)-ene and 4α,8,14-trimethyl-11β-hydroxy-18-nor-5α,8α,14β-androstane-3,17-dione. A novel product 3,17-bisethylenedioxy-4α,8,14-trimethyl-18-nor - 5α,8α,13α,14β-androstane-11-one is formed during the ketalization of 4α,8,14-trimethyl-18-nor-5α,8α,14β-androstane-3,11,17-trione. This product when hydrolyzed, reduced and dehydrated in the manner set forth herein will give corresponding 13α derivatives, such as 3,17-bisethylenedioxy-11β-hydroxy-4α,8,14 - trimethyl-18 - nor - 5α,8α,13α,14β-androstane; 11β-hydroxy - 4α,8,14-trimethyl-18-nor-5α,8α,13α,14β-androstane-3,17-dione; 3,17-bisethylenedioxy-4α,8,14-trimethyl-18-nor-5α,8α,13α,14β-androst - 9(11) - ene and 4α,8,14-trimethyl - 18 - nor - 5α,8α,13α,14β - androst-9(11)-en-3,17-dione. Hydrolysis of 3,17-bisethylenedioxy-4α,8,14-trimethyl-18-nor-5α,8α,13α,14β - androstane - 11-one will also form 4α,8,14-trimethyl-18-nor-5α,8α,13α,14β-androstane-3,11,17-trione.

Further, the acyloxy derivatives of the Δ⁹⁽¹¹⁾ compounds of the invention are prepared by starting with the compound 3α-acetoxy-4α,8,14-trimethyl-18-nor-5α,8α,9β,14β-androstane-11,17-dione. This compound can be ketalized by reacting it with ethylene glycol in a manner substantially as hereinbefore set forth. The reaction mixture will contain 3α-acetoxy-17-ethylenedioxy-4α,8,14-trimethyl-18-nor-5α,8α,9β,14β-androstane-11 - one and a new intermediate 3α-acetoxy-11,17-bisethylenedioxy - 4α,8,14 - trimethyl-18-nor-5α,8α,9β,13α,14β-androstane. It has been discovered that this latter new intermediate may be hydrolyzed by reacting it with a weak acid, e.g., acetic acid, to form 3α-acetoxy-4α,8,14-trimethyl-18-nor-5α,8α,9β,13α,14β-androstane-11,17-dione. 3α-acetoxy-17-ethylenedioxy-4α,8,14-trimethyl-18-nor-5α,8α,9β,14β-androstane-11 - one may be reduced by known methods to form the intermediate 17-ethylenedioxy-3α,11α-dihydroxy-4α,8,14 - trimethyl-18-nor-5α,8α,9β,14β - androstane. Acylation, hydrolysis and dehydration of this intermediate by procedures set forth herein will yield 3α-acetoxy-17-ethylenedioxy-11α-hydroxy-4α,8,14-trimethyl-18 - nor - 5α,8α,9β,14β-androstane; 3α-acetoxy-11α-hydroxy - 4α,8,14 - trimethyl-18-nor-5α,8α,9β,14β-androstane-17-one; 3α - acetoxy-17-ethylenedioxy-4α,8,14-trimethyl-18 - nor - 5α,8α,14β-androst-9(11)-ene; and a final product 3α-acetoxy-4α,8,14-trimethyl-18-nor-5α,8α,14β-androst - 9(11) - ene-17-one. Following the procedure set forth above, but utilizing 3β-acetoxy-4α,8,14-trimethyl-18-nor - 5α,8α,9β,14β-androstane-11,17-dione in lieu of the 3α-acetoxy-4α,8,14-trimethyl-18-nor-5α,8α,9β,14β - androstane - 11,17-dione, the corresponding 3β derivatives are obtained.

The starting material 3β-acetoxy-4α,8,14-trimethyl-18-nor-5α,8α,9β,14β-androstane-11,17-dione is prepared by the treatment of 3β,16β-diacetoxy-11α-hydroxy-4α,8,14-trimethyl-18-nor-5α,8α,9β,13α,14β-cholest - 17(20) - ene-21-oic acid with a methylating agent, e.g., ethereal diazomethane, to give the corresponding methyl ester. This compound when treated with ozone at a reduced temperature in a suitable solvent, e.g., −70° C. in methylene chloride containing a trace of pyridine is converted to 3β,16β-diacetoxy-4α,8,14-trimethyl-18 - nor - 5α,8α,9β,13α,14β-androstane-11,17 - dione. This compound can be deacetoxylated and epimerized in one step by heating in the presence of glacial acetic acid and zinc dust to give 3β-acetoxy-4α,8,14-trimethyl-18-nor - 5α,8α,9β,14β - androstane-11,17-dione.

The final products 3α-acetoxy-4α,8,14-trimethyl-18-nor-5α,8α,14β-androst-9(11)-ene-17-one and 3α-acetoxy-4α,8,14-trimethyl-18-nor-5α,8α,13α,14β-androst-9(11)-ene - 17-one may also be prepared by starting with the material 3α-acetoxy-4α,8,14-trimethyl-18-nor-5α,8α,14β - androstane-11,17-dione, the preparation of which is disclosed in U.S. patent application Ser. No. 399,339, filed Sept. 25, 1964. Following the same procedure utilizing the starting material 3β-acetoxy-4α,8,14-trimethyl-18-nor-5α,8α,14β - androstane-11,17-dione, which is prepared by the epimerization and reacetylation of 3β-acetoxy-4α,8,14-trimethyl-18-nor-5α,8α,9β,14β-androstane-11,17-dione leads to the corresponding 3β-acetoxy-4α,8,14-trimethyl-18-nor - 5α,8α,13α,14β-androst-9(11)-ene-17-one and 3β-acetoxy-4α,8,14-trimethyl-18-nor-5α,8α,14β-androst-9(11)-ene-17 - one, which are obtainable utilizing substantially the same procedures as those described above for the preparation of 3α-acetoxy-4α,8,14-trimethyl-18-nor-5α,8α,14β - androst-9(11)-ene-17 - one and the 13α - isomer. Intermediates formed utilizing 3α-acetoxy-4α,8,14-trimethyl-18-nor-5α,8α,14β-androstane-11,17-dione and 3β-acetoxy-4α,8,14-trimethyl-18-nor-5α,8α,14β-androstane-11,17-dione as starting materials are, respectively, 3α-acetoxy-17-ethylenedioxy-4α,8,14-trimethyl-18-nor-5α,8α,14β-androstane-11-one;

3β-acetoxy-17-ethylenedioxy-4α,8,14-trimethyl-18-nor-5α,8α,14β-androstane-11-one;

3α-acetoxy-17-ethylenedioxy-4α,8,14-trimethyl-18-nor-5α,8α,13α,14β-androstane-11-one;

3β-acetoxy-17-ethylenedioxy-4α,8,14-trimethyl-18-nor-5α,8α,13α,14β-androstane-11-one;

17-ethylenedioxy-3α,11β-dihydroxy-4α,8,14-trimethyl-18-nor-5α,8α,14β-androstane;

17-ethylenedioxy-3β,11β-dihydroxy-4α,8,14-trimethyl-18-nor-5α,8α,14β-androstane;

17-ethylenedioxy-3α,11β-dihydroxy-4α,8,14-trimethyl-18-nor-5α,8α,13α,14β-androstane;

17-ethylenedioxy-3β,11β-dihydroxy-4α,8,14-trimethyl-18-nor-5α,8α,13α,14β-androstane;

3α-acetoxy-17-ethylenedioxy-11β-hydroxy-4α,8,14-trimethyl-18-nor-5α,8α,14β-androstane;

3β-acetoxy-17-ethylenedioxy-11β-hydroxy-4α,8,14-trimethyl-18-nor-5α,8α,14β-androstane;

3α-acetoxy-17-ethylenedioxy-11β-hydroxy-4α,8,14-trimethyl-18-nor-5α,8α,13α,14β-androstane;

3β-acetoxy-17-ethylenedioxy-11β-hydroxy-4α,8,14-trimethyl-18-nor-5α,8α,13α,14β-androstane;

3α-acetoxy-17-ethylenedioxy-4α,8,14-trimethyl-18-nor-5α,8α,14β-androst-9(11)-ene;

3β-acetoxy-17-ethylenedioxy-4α,8,14-trimethyl-18-nor-5α,8α,14β-androst-9(11)-ene;

3α-acetoxy-11β-hydroxy-4α,8,14-trimethyl-18-nor-5α,8α,14β-androstane-17-one;

3β-acetoxy-11β-hydroxy-4α,8,14-trimethyl-18-nor-5α,8α,14β-androstane-17-one;

3α-acetoxy-11β-hydroxy-4α,8,14-trimethyl-18-nor-5α,8α,13α,14β-androstane-17-one;

3β-acetoxy-11β-hydroxy-4α,8,14-trimethyl-18-nor-5α,8α,13α,14β-androstane-17-one;

3α-acetoxy-17-ethylenedioxy-4α,8,14-trimethyl-18-nor-5α,8α,13α,14β-androst-9(11)-ene;

3β-acetoxy-17-ethylenedioxy-4α,8,14-trimethyl-18-nor-5α,8α,13α,14β-androst-9(11)-ene.

The processes of this invention may be best illustrated by the following:

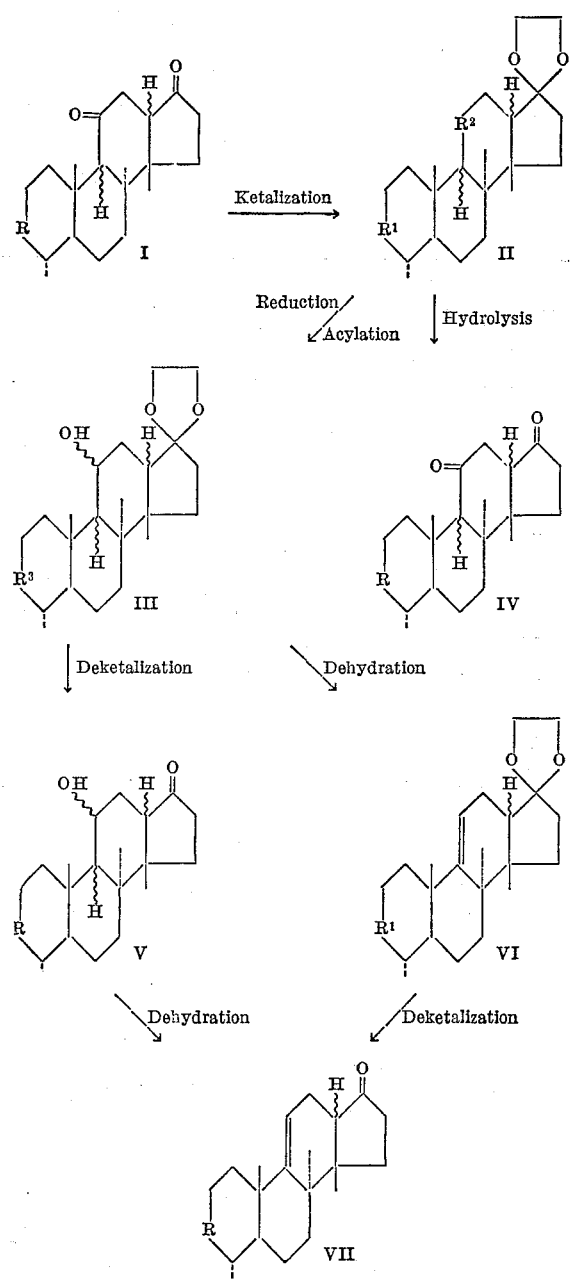

wherein R is C=O,

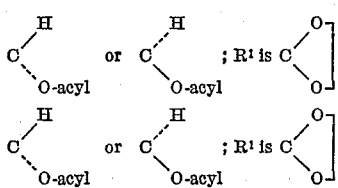

or C=O; and R³ is C=O,

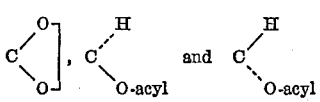

In addition, hydrolysis of 3α- or 3β-acetoxy-17-ethylenedioxy-4α,8,14-trimethyl-18-nor-5α,8α,13α,14β-androstane-11-one in a weak acid such as acetic acid gives the new compounds 3α- and 3β-acetoxy-4α,8,14-trimethyl-18-nor-5α,8α,13α,14β-androstane-11,17-dione, respectively.

The invention may be illustrated by the following examples. All temperatures are in degrees centigrade unless otherwise stated.

*Example 1.—Methyl 3β,16β-diacetoxy-11α-hydroxy-4α,8, 14-trimethyl-18-nor-5α,8α,9β,13α,14β-cholest - 17(20)-ene-21-oate*

A solution of 3β,16β-diacetoxy-11α-hydroxy-4α,8,14-trimethyl-18-nor-5α,8α,9β,13α,14β-cholest - 17(20) - ene-21-oic acid in ether is treated with excess ethereal diazomethane. Evaporation of the solvent gives methyl 3β,16β-diacetoxy-11α-hydroxy-4α,8,14-trimethyl-18 - nor - 5α,8α, 9β,13α,14β-cholest-17(20)-ene-21-oate.

*Example 2.—3α,16β-diacetoxy-4α,8,14-trimethyl-18 - nor-5α,8α,9β,13β,14β-androstane-11,17-dione*

A stream of oxygen-ozone mixture is passed through a solution of 5.74 g. of methyl 3β,16β-diacetoxy-11α-hydroxy-4α,8,14-trimethyl-18-nor-5α,8α,9β,13α,14β - cholest-17(20)-ene-21-oate in 250 ml. of methylene chloride containing 2.5 ml. of pyridine. The solution is kept at —70° C. and a total of 110 mmoles of ozone is passed through. After warming to room temperature, the solution is stirred with 5 g. of zinc dust and 10 ml. of acetic acid for one hour. The solution is filtered, washed with water, sodium bicarbonate solution, water, dried and evaporated to give crude 3β,16β-diacetoxy-4α,8,14-trimethyl-18-nor - 5α,8α, 9β,13α,14β-androstane-11,17-dione.

*Example 3.—3β-acetoxy-4α,8,14-trimethyl-18-nor - 5α,8α, 9β,14β-androstane-11,17-dione*

A solution of 3β,16β-diacetoxy-4α,8,14-trimethyl - 18-nor-5α,8α,9β,13α,14β-androstane-11,17 - dione in glacial acetic acid containing zinc dust was refluxed for 3 hours. After cooling, the solution was filtered and evaporated in vacuo to give 3β-acetoxy-4α,8,14-trimethyl-18-nor-5α,8α, 9β,14β-androstane-11,17-dione.

*Example 4.—3β-hydroxy-4α,8,14-trimethyl-18-nor-5α,8α, 14β-androstane-11,17-dione*

A solution of 5% ethanolic potassium hydroxide is heated to reflux under a blanket of helium. To the hot solution is added 3β-acetoxy-4α,8,14-trimethyl-18-nor - 5α,8α,9β, 14β-androstane-11,17-dione and the mixture is refluxed for 3 hours under helium. The reaction mixture is then acidified with 20% sulfuric acid, cooled and diluted with water. After evaporation of the alcohol, the aqueous residue is extracted with methylene chloride and the methylene chloride solution washed with water until neutral, dried over magnesium sulfate and evaporated to give 3β-hydroxy-4α,8,14-trimethyl-18-nor-5α,8α,14β-androstane - 11, 17-dione.

*Example 5.—3β-acetoxy-4α,8,14-trimethyl-18-nor - 5α,8α, 14β-androstane-11,17-dione*

A solution of 3β-hydroxy-4α,8,14-trimethyl-18-nor-5α, 8α,14β-androstane-11,17-dione in a mixture of pyridine-acetic anhydride (2:1) is left overnight at room temperature. The excess acetic anhydride is decomposed with water and the mixture evaporated to give 3β-acetoxy-4α,8,14-trimethyl-18-nor-5α,8α,14β-androstane-11,17-dione.

*Examples 6 to 11*

Substantially following the procedure of Example 5 but utilizing molar equivalents of the compounds set forth in Table A in lieu of 3β-hydroxy-4α,8,14-trimethyl-18-nor-5α, 8α,14β-androstane-11,17-dione, the products obtained are as indicated.

TABLE A

| Ex. | Reactant | Product |
|---|---|---|
| 6 | 17-ethylenedioxy-3α,11α-dihydroxy-4α,8,14-trimethyl-18-nor-5α,8α,9β,14β-androstane. | 3α-acetoxy-17-ethylenedioxy-11α-hydroxy-4α,8,14-trimethyl-18-nor-5α,8α,9β,14β-androstane. |
| 7 | 17-ethylenedioxy-3β,11α-dihydroxy-4α,8,14-trimethyl-18-nor-5α,8α,9β,14β-androstane. | 3β-acetoxy-17-ethylenedioxy-11α-hydroxy-4α,8,14-trimethyl-18-nor-5α,8α,9β,14β-androstane. |
| 8 | 17-ethylenedioxy-3α,11β-dihydroxy-4α,8,14-trimethyl-18-nor-5α,8α,14β-androstane. | 3α-acetoxy-17-ethylenedioxy-11β-hydroxy-4α,8,14-trimethyl-18-nor-5α,8α,14β-androstane. |
| 9 | 17-ethylenedioxy-3β,11β-dihydroxy-4α,8,14-trimethyl-18-nor-5α,8α,14β-androstane. | 3β-acetoxy-17-ethylenedioxy-11β-hydroxy-4α,8,14-trimethyl-18-nor-5α,8α,14β-androstane. |
| 10 | 17-ethylenedioxy-3α,11β-dihydroxy-4α,8,14-trimethyl-18-nor-5α,8α,13α,14β-androstane. | 3α-acetoxy-17-ethylenedioxy-11β-hydroxy-4α,8,14-trimethyl-18-nor-5α,8α,13α,14β-androstane. |
| 11 | 17-ethylenedioxy-3β,11β-dihydroxy-4α,8,14-trimethyl-18-nor-5α,8α,13α,14β-androstane. | 3β-acetoxy-17-ethylenedioxy-11β-hydroxy-4α,8,14-trimethyl-18-nor-5α,8α,13α,14β-androstane. |

Examples 12 to 14

Following the procedure of Example 5 but utilizing molar equivalents of the reactants of Table B in lieu of acetic acid and 17-ethylenedioxy-3α,11α-dihydroxy-4α,8,14-trimethyl-18-nor-5α,8α,9β,14β-androstane in place of 3β-hydroxy-4α,8,14-trimethyl-18-nor - 5α,8α,14β - androstane-11,17-dione, the products obtained are as indicated.

TABLE B

| Ex. | Reactant | Product |
|---|---|---|
| 12 | Propionic anhydride. | 3α-propionyloxy-17-ethylenedioxy-11α-hydroxy-4α,8,14-trimethyl-18-nor-5α,8α,9β,14β-androstane. |
| 13 | Benzoic anhydride. | 3α-benzoyloxy-17-ethylenedioxy-11α-hydroxy-4α,8,14-trimethyl-18-nor-5α,8α,9β,14β-androstane. |
| 14 | Phenylacetic anhydride. | 3α-phenylacetoxy-17-ethylenedioxy-11α-hydroxy-4α,8,14-trimethyl-18-nor-5α,8α,9β,14β-androstane. |

Example 15.—3,17-bisethylenedioxy-4α,8,14-trimethyl-18-nor-5α,8α,14β-androstane-11-one and 3,17-bisethylenedioxy - 4α,8,14 - trimethyl - 18 - nor - 5α,8α,13α,14β-androstane-11-one A mixture of 468 mg. of 4α,8,14-trimethyl-18-nor-5α,8α,14β- androstane-3,11,17-trione, 117 ml. of dry benzene, 23 ml. of ethylene glycol and 46 mg. of p-toluenesulfonic acid monohydrate is stirred and refluxed for 40 hours. The water formed during the reaction is removed by a Dean-Stark moisture trap and containing a calcium carbide thimble. The yellow solution thus formed is then diluted with chloroform and washed with 5% sodium bicarbonate and then with water and evaporated, in vacuo. The residue on crystallization from acetone-hexane gives 302 mg. of 3,17-bisethylenedioxy-4α,8,14-trimethyl - 18 - nor - 5α,8α,14β-androstane-11-one having a melting point about 182–184° C., $[\alpha]_D^{22}$ —132° (chloroform), $\lambda_{max}^{nujol}$ 5.91 mμ

Analysis.—Calc'd for $C_{25}H_{38}O_5$ (418.55): C, 71.74; H, 9.15. Found: C, 71.60; H, 9.07.

The mother liquor is evaporated and the residue is plate chromatographed on neutral alumina using chloroform-hexane (3:1, v:v) as the developing solvent. Detection by iodine vapor shows two visible bands at Rf≈0.6 and 0.4, respectively. Elution of the latter band with ethyl acetate, evaporation and crystallization gives an additional 126 mg. of 3,17-bisethylenedioxy-4α,8,14-trimethyl-18-nor-5α,8α,14β-androstane-11-one. From the less polar band by following the above procedure, 105 mg. of 3,17-bisethylenedioxy-4α,8,14-trimethyl-18-nor-5α,8α, 13α,14β-androstane-11-one is obtained having a melting point about 215–216° C., $[\alpha]^{22}$ —160° (chloroform), $\lambda_{max}^{nujol}$ 5.91 mμ

Analysis.—Calc'd for $C_{25}H_{38}O_5$ (418.55): C, 71.74; H, 9.15. Found: C, 71.68; H, 9.21.

Examples 16 to 18

Following the procedure of Example 15 but utilizing the reactants of Table C in lieu of 4α,8,14-trimethyl-18-nor - 5α,8α,14β - androstane-3,11-17-trione, the products formed are as indicated.

TABLE C

| Ex. | Reactant | Product |
|---|---|---|
| 16 | 3β-acetoxy-4α,8,14-trimethyl-18-nor-5α,8α,9β,14β-androstane-11,17-dione. | 3β-acetoxy-17-ethylenedioxy-4α,8,14-trimethyl-18-nor-5α,8α,9β,14β-androstane-11-one; and 3β-acetoxy-11,17-bisethylenedioxy-4α,8,14-trimethyl-18-nor-5α,8α,9β,13α,14β-androstane. |
| 17 | 3β-acetoxy-4α,8,14-trimethyl-18-nor-5α,8α,14β-androstane-11,17-dione. | 3β-acetoxy-17-ethylenedioxy-4α,8,14-trimethyl-18-nor-5α,8α,14β-androstane-11-one; and 3β-acetoxy-17-ethylenedioxy-4α,8,14-trimethyl-18-nor-5α,8α,13α,14β-androstane-11-one. |
| 18 | 3β-phenylacetoxy-4α,8,14-trimethyl-18-nor-5α,8α,14β-androstane-11,17-dione. | 3β-phenylacetoxy-17-ethylenedioxy-4α,8,14-trimethyl-18-nor-5α,8α,14β-androstane-11-one; and 3β-phenylacetoxy-17-ethylenedioxy-4α,8,14-trimethyl-18-nor-5α,8α,13α,14β-androstane-11-one. |

Example 19.—3,17-bisethylenedioxy-4α,8,14-trimethyl-18-nor-5α,8α,9β,14β-androstane-11-one and 3,11,17-trisethylenedioxy - 4α,8,14 - trimethyl-18-nor-5α,8α,9β,13α,14β-androstane A mixture of 400 mg. of 4α,8,14-trimethyl-18-nor-5α, 8α,9β,14β-androstane-3,11,17-trione, 100 ml. of dry benzene, 20 ml. of ethylene glycol and 40 mg. of p-toluenesulfonic acid monohydrate is treated as described in Example 15 and there are obtained 226 mg. of 3,17-bisethylenedioxy-4α,8,14-trimethyl-18-nor - 5α,8α,9β,14β - androstane-11-one and 37 mg. of 3,11,17-trisethylenedioxy-4α,8, 14-trimethyl-18-nor-5α,8α,9β,13α,14β-androstane having a melting point about 235–237° C., $[\alpha]_D^{22}$ —35° (chloroform).

Analysis.—Calc'd for $C_{27}H_{42}O_6$ (462.61): C, 70.10; H, 9.15. Found: C, 70.07; H, 9.13.

Example 20.—3α-acetoxy - 17 - ethylenedioxy-4α,8,14-trimethyl-18-nor-5α,8α,9β,14β-androstane-11-one and 3α-acetoxy-11,17-bisethylenedioxy - 4α,8,14 - trimethyl-18-nor-5α,8α,9β,13α,14β-androstane Following the procedure of Example 15 but substituting 3α-acetoxy-4α,8,14-trimethyl-18-nor-5α,8α,9β,14β-androstane-11,17-dione for 4α,8,14-trimethyl-18-nor-5α,8α, 14β-androstane-3,11,17-trione, there is obtained 3α-acetoxy-17-ethylenedioxy-4α,8,14-trimethyl-18-nor-5α,8α,9β, 14β-androstane-11-one, melting point about 137–139° C., $[\alpha]_D$ —14° (chloroform).

Analysis.—Calc'd for $C_2H_{38}O_5$: C, 71.74; H, 9.15. Found: C, 72.12; H, 8.74, and 3α-acetoxy-11,17-bisethylenedioxy-4α,8,14-trimethyl-18-nor-5α,8α,9β,13α,14β-androstane having a melting point 207–213° C., $[\alpha]_D$—2.0° (chloroform).

Analysis.—Calc'd for $C_{27}H_{42}O_6$ (462.6): C, 70.10; H, 9.15. Found: C, 69.71; H, 8.96.

Example 21.—4α,8,14-trimethyl-18-nor-5α,8α,13α,14β-androstane-3,11,17-trione A solution of 50 mg. of 3,17-bisethylenedioxy-4α,8,14-trimethyl-18-nor-5α,8α,13α,14β-androstane-11-one in 4.0 ml. of 80% acetic acid is kept at room temperature overnight and then diluted with water. The mixture is extracted with chloroform which is washed with water and evaporated in vacuo. The residue (41.5 mg.) on crystallization from acetone-hexane gives 33 mg. of 4α,8,14-trimethyl-18-nor-5α,8α,13α,14β-androstane - 3,11,17 - trione having a melting point about 170–172° C. [α]$_D^{22}$ —275° (chloroform).

*Analysis.*—Calc'd for C$_{21}$H$_{30}$O$_3$ (330.45): C, 76.32; H, 9.15. Found: C, 76.40; H, 9.18.

*Examples 22 to 35*

When the procedure of Example 21 is substantially followed utilizing molar equivalents of the reactants in Table D in lieu of 3,17-bisethylenedioxy-4α,8,14-trimethyl-18-nor-5α,8α,13α,14β - androstane - 11 - one, the products indicated will be formed.

TABLE D

| Ex. | Reactant | Product |
|---|---|---|
| 22 | 3,17-bisethylene-11β-hydroxy-4α,8,14-trimethyl-18-nor-5α,8α,14β-androstane. | 11β-hydroxy-4α,8,14-trimethyl-18-nor-5α,8α,14β-androstane-3,17-dione. |
| 23 | 3β-acetoxy-11,17-bisethylenedioxy-4α,8,14-trimethyl-18-nor-5α,8α,9β,13α,14β-androstane. | 3β-acetoxy-4α,8,14-trimethyl-18-nor-5α,8α,9β,13α,14β-androstane-11,17-dione. |
| 24 | 3α-acetoxy-17-ethylene-dioxy-11α-hydroxy-4α,8,14-trimethyl-18-nor-5α,8α,9β,14β-androstane. | 3α-acetoxy-11α-hydroxy-4α,8,14-trimethyl-18-nor-5α,8α,9β,14β-androstane-17-one. |
| 25 | 3β-acetoxy-17-ethylene-dioxy-11α-hydroxy-4α,8,14-trimethyl-18-nor-5α,8α,9β,14β-androstane. | 3β-acetoxy-11α-hydroxy-4α,8,14-trimethyl-18-nor-5α,8α,9β,14β-androstane-17-one. |
| 26 | 3α-acetoxy-17-ethylene-dioxy-4α,8,14-trimethyl-18-nor-5α,8α,14β-androst-9(11)-ene. | 3α-acetoxy-4α,8,14-trimethyl-18-nor-5α,8α,14β-androst-9(11)-en-17-o e. |
| 27 | 3β-acetoxy-17-ethylenedioxy-4α,8,14-trimethyl-18-nor-5α,8α,14β-androst-9(11)-ene. | 3β-acetoxy-4α,8α,14-trimethyl-18-nor-5α,8α,14β-androst-9(11)-en-17-one. |
| 28 | 3α-acetoxy-17-ethylene-dioxy-4α,8,14-trimethyl-18-nor-5α,8α,13α,14β-androstane-11-one. | 3α-acetoxy-4α,8,14-trimethyl-18-nor-5α,8α,13α,14β-androstane-11,17-dione. |
| 29 | 3β-acetoxy-17-ethylenedioxy-4α,8,14-trimethyl-18-nor-5α,8α,13α,14β-androstane-11-one. | 3β-acetoxy-4α,8,14-trimethyl-18-nor-5α,8α,13α,14β-androstane-11,17-dione. |
| 30 | 3α-acetoxy-17-ethylenedioxy-11β-hydroxy-4α,8,14-trimethyl-18-nor-5α,8α,14β-androstane. | 3α-acetoxy-11β-hydroxy-4α,8,14-trimethyl-18-nor-5α,8α,14β-androstane-17-one. |
| 31 | 3β-acetoxy-17-ethylene-dioxy-11β-hydroxy-4α,8,14-trimethyl-18-nor-5α,8α,14β-androstane. | 3β-acetoxy-11β-hydroxy-4α,8,14-trimethyl-18-nor-5α,8α,14β-androstane-17-one. |
| 32 | 3α-acetoxy-17-ethylene-dioxy-11β-hydroxy-4α,8,14-trimethyl-18-nor-5α,8α,13α,14β-androstane. | 3α-acetoxy-11β-hydroxy-4α,8,14-trimethyl-18-nor-5α,8α,13α,14β-androstane-17-one. |
| 33 | 3β-acetoxy-17-ethylene-dioxy-11β-hydroxy-4α,8,14-trimethyl-18-nor-5α,8α,13α,14β-androstane. | 3β-acetoxy-11β-hydroxy-4α,8,14-trimethyl-18-nor-5α,8α,13α,14β-androstane-17-one. |
| 34 | 3α-acetoxy-17-ethylene-dioxy-4α,8,14-trimethyl-18-nor-5α,8α,13α,14β-androst-9(11)-ene. | 3α-acetoxy-4α,8,14-trimethyl-18-nor-5α,8α,13α,14β-androst-9(11)-ene-17-one. |
| 35 | 3β-acetoxy-17-ethylenedioxy-4α,8,14-trimethyl-18-nor-5α,8α,13α,14β-androst-9(11)-ene. | 3β-acetoxy-4α,8,14-trimethyl-18-nor-5α,8α,13α,14β-androst-9(11)-ene-17-one. |

*Example 36.—4α,8,14-trimethyl-18-nor-5α,8α,9β,13α,14β-androstane-3,11,17-trione*

Following the procedure of Example 21 but substituting 3,11,17-trisethylenedioxy - 4α,8,14-trimethyl-18-nor-5α,8α,9β,13α,14β-androstane for the 3,17-bisethylenedioxy-4α,8,14-trimethyl-18-nor-5α,8α,13α,14β - androstane-11-one, there is obtained 4α,8,14-trimethyl-18-nor - 5α,8α,9β,13α,14β-androstane-3,11,17-trione, melting point 203–205° C., [α]$_D$ +31.4°.

*Example 37.—11β-hydroxy-4α,8,14-trimethyl-18-nor-5α,8α,13α,14β-androstane-3,17-dione*

Following the procedure of Example 21 but substituting 11β-hydroxy-3,17-bisethylenedioxy - 4α,8,14-trimethyl-18-nor-5α,8α,13α,14β-androstane for the 3,17-bisethylenedioxy-4α,8,14-trimethyl-18-nor-5α,8α,13α,14β - androstane-11-one, there is obtained 11β-hydroxy-4α,8,14-trimethyl-18-nor-5α,8α,13α,14β - androstane - 3,17-dione having a melting point about 206–208° C.

*Example 38.—4α,8,14-trimethyl-18-nor-5α,8α,14β-androst-9(11)-en-3,17-dione*

A solution of 51.7 mg. of 3,17-bisethylenedioxy-4α,8,14-trimethyl-18-nor-5α,8α,14β-androst-9(11)-ene in a mixture of 4 ml. of glacial acetic acid and 1 ml. of water is kept at room temperature for 16 hours, then slowly diluted with water. The crystals which separate are filtered, washed with water and dried to give 29 mg. of 4α,8,14-trimethyl-18-nor-5α,8α,14β - androst-9(11)-en-3,17-dione having a melting point about 180–182° C.

*Example 39.—4α,8,14-trimethyl-18-nor-5α,8α,13α,14β-androst-9(11)-en-3,17-dione*

Following the procedure of Example 21 but substituting 3,17-bisethylenedioxy-4α,8,14 - trimethyl - 18-nor-5α,8α,13α,14β-androst-9(11)-ene for the 3,17-bisethylenedioxy-4α,8,14-trimethyl-18-nor-5α,8α,13α,14β - androstane-11-one, there is obtained 4α,8,14-trimethyl-18-nor-5α,8α,13α,14β-androst-9(11)-en-3,17 - dione having a melting point about 156–157° C., [α]$_D$ —156° (chloroform).

*Example 40.—4α,8,14-trimethyl-11α-hydroxy-18-nor-5α,8α,9β,14β-androstan-3,17-dione*

Following the procedure of Example 21 but substituting 11α-hydroxy-3,17-bisethylenedioxy-4α,8,14-trimethyl-18-nor-5α,8α,9β,14β-androstane for the 3,17-bisethylenedioxy-4α,8,14 - trimethyl-18 - nor-5α,8α,13α,14β - androstane-11-one, there is obtained 11α-hydroxy-4α,8,14-trimethyl-18-nor-5α,8α,9β,14β-androstane-3,17-dione having a melting point about 181–183° C.

*Example 41.—3α-acetoxy-4α,8,14-trimethyl-18-nor-5α,8α,9β,13α,14β-androstane-11,17-dione*

Following the procedure of Example 21 but substituting 3α-acetoxy-11,17 - bisethylenedioxy-4α,8,14-trimethyl-18-nor-5α,8α,9β,13α,14β-androstane for 3,17-bisethylenedioxy-4α,8,14 - trimethyl - 18-nor-5α,8α,13α,14β - androstane-11-one, there is obtained 3α-acetoxy - 4α,8,14-trimethyl-18-nor-5α,8α,9β,13α,14β-androstane-11,17 - dione, melting point about 199–201° C., [α]$_D$ —71° (chloroform).

*Analysis.*—Calc'd for C$_{23}$H$_{34}$O$_4$: C, 73.76; H, 9.15. Found: C, 73.65; H, 19.14.

*Example 42.—3,17-bisethylenedioxy-11β-hydroxy-4α,8, 14-trimethyl-18-nor-5α,8α,14β-androstane*

To a solution of 600 mg. of 3,17-bisethylenedioxy-4α,8, 14-trimethyl-18-nor-5α,8α,14β-androstane-11-one in 50 ml. of tetrahydrofuran (freshly distilled from lithium aluminum hydride), 600 mg. of lithium aluminum hydride are added in portions over a five minute period and the suspension stirred at room temperature for 2.5 hours. The lithium aluminum hydride is then decomposed by the dropwise addition of methanol, the mixture diluted with water and extracted with chloroform. The chloroform is washed with water, evaporated in vacuo, and the residue crystallized from acetone-hexane to give 547 mg. of 3,17-bisethylenedioxy-11β-hydroxy-4α,8,14 - trimethyl-18-nor-5α,8α,14β-androstane, having a melting point about 202–204° C., [α]$_D^{22}$ —60° (chloroform).

*Analysis.*—Calc'd for C$_{25}$H$_{40}$O$_5$ (420.60): C, 71.39; H, 9.59. Found: C, 71.25; H, 9.76.

*Examples 43 to 49*

Substantially following the procedure of Example 42 but utilizing molar equivalents of the compounds indicated in Table E in lieu of 3,17-bisethylenedioxy-4α,8,14-trimethyl-18-nor-5α,8α,14β-androstane-11-one, the products shown will be obtained.

TABLE E

| Ex. | Reactant | Product |
|---|---|---|
| 43 | 3α-acetoxy-17-ethylene-dioxy-4α,8,14-trimethyl-18-nor-5α,8α,14β-androstane-11-one. | 17-ethylenedioxy-3α,11β-dihydroxy-4α,8,14-trimethyl-18-nor-5α,8α,14β-androstane. |
| 44 | 3β-acetoxy-17-ethylenedioxy-4α,8,14-trimethyl-18-nor-5α,8α,14β-androstane-11-one. | 17-ethylenedioxy-3β,11β-dihydroxy-4α,8,14-trimethyl-18-nor-5α,8α,14β-androstane. |
| 45 | 3α-acetoxy-17-ethylenedioxy-4α,8,14-trimethyl-18-nor-5α,8α,13α,14β-androstane-11-one. | 17-ethylenedioxy-3α,11β-dihydroxy-4α,8,14-trimethyl-18-nor-5α,8α,13α,14β-androstane. |
| 46 | 3β-acetoxy-17-ethylenedioxy-4α,8,14-trimethyl-18-nor-5α,8α,13α,14β-androstane-11-one. | 17-ethylenedioxy-3β,11β-dihydroxy-4α,8,14-trimethyl-18-nor-5α,8α,13α,14β-androstane. |
| 47 | 3β-propionyloxy-17-ethylene-dioxy-4α,8,14-trimethyl-18-nor-5α,8α,13α,14β-androstane-11-one. | Do. |
| 48 | 3α-acetoxy-17-ethylenedioxy-4α,8,14-trimethyl-18-nor-5α,8α,9β,14β-androstane-11-one. | 17-ethylenedioxy-3α,11α-dihydroxy-4α,8,14-trimethyl-18-nor-5α,8α,9β,14β-androstane. |
| 49 | 3β-acetoxy-17-ethylenedioxy-4α,8,14-trimethyl-18-nor-5α,8α,9β,14β-androstane-11-one. | 17-ethylenedioxy-3β,11α-dihydroxy-4α,8,14-trimethyl-18-nor-5α,8α,9β,14β-androstane. |

*Example 50.—3,17-bisethylenedioxy-11β-hydroxy-4α,8,14-trimethyl-18-nor-5α,8α,13α,14β-androstane*

Following the procedure of Example 42 but substituting 3,17-bisethylenedioxy-4α,8,14-trimethyl-18 - nor - 5α,8α,13α,14β-androstane-11-one for 3,17-bisethylene-4α,8,14-trimethyl-18-nor-5α,8α,14β-androstane-11-one, there is obtained 3,17-bisethylenedioxy-11β-hydroxy - 4α,8,14 - trimethyl-18-nor-5α,8α,13α,14β-androstane having a melting point about 211–213° C., $[\alpha]_D^{22}$ —66° (chloroform).

Analysis.—Calc'd for $C_{25}H_{40}O_5$ (420.57): C, 71.39; H, 9.59. Found: C, 71.77; H, 9.14.

*Example 51.—11α-hydroxy-3,17-bisethylenedioxy-4α,8,14-trimethyl-18-nor-5α,8α,9β,14β-androstane*

Following the procedure of Example 42 but substituting 3,17 - bisethylenedioxy-4α,8,14-trimethyl-18-nor-5α,8α,9β,14β-androstane-11-one for the 3,17-bisethylenedioxy-4α,8,14-trimethyl-18-nor-5α,8α,14β-androstane-11-one, there is obtained 11α-hydroxy-3,17-bisethylenedioxy-4α,8,14-trimethyl-18-nor-5α,8α,9β,14β-androstane having a melting point about 173–175° C., $[\alpha]_D^{22}$ —82° (chloroform).

Analysis.—Calc'd for $C_{25}H_{40}O_5$ (420.60): C, 71.39; H, 9.59. Found: C, 71.61; H, 9.39.

*Example 52.—11β-hydroxy-4α,8,14-trimethyl-18-nor-5α,8α,14β-androstane-3,17-dione*

A solution of 100 mg. of 3,17-bisethylenedioxy-11β-hydroxy-4α,8,14-trimethyl-18-nor-5α,8α,14β-androstane in a mixture of 10 ml. of methanol and 0.35 ml. of 8% sulfuric acid is refluxed for one hour, then partially evaporated and diluted with water. The crystals which separate are filtered, washed with water and dried to give 74 mg. of 11β-hydroxy-4α,8,14-trimethyl-18-nor-5α,8α,14β-androstane-3,17-dione having a melting point of 206°–208° C., $[\alpha]_D^{22}$ +34° (chloroform).

Analysis.—Calc'd for $C_{21}H_{32}O_3$ (332.49): C, 75.86; H, 9.70. Found: C, 75.90; H, 9.75.

*Example 53.—11β-hydroxy-4α,8,14-trimethyl-18-nor-5α,8α,14β-androstane-3,17-dione*

Following the procedure of Example 52 but substituting 3,17-bisethylenedioxy-11β-hydroxy - 4α,8,14 - trimethyl-18-nor-5α,8α,13α,14β-androstane for 3,17-bisethylene-11β-hydroxy - 4α,8,14-trimethyl-18-nor-5α,8α,14β-androstane, there is obtained 11β-hydroxy-4α,8,14-trimethyl-18-nor-5α,8α,14β-androstane-3,17-dione.

*Example 54.—3,17-bisethylenedioxy-4α,8,14-trimethyl-18-nor-5α,8α,14β-androst-9(11)-ene*

To a solution of 274 mg. of 3,17-bisethylene-11β-hydroxy-4α,8,14-trimethyl-18-nor-5α,8α,14β - androstane in 8.1 ml. of pyridine cooled to —20° C., 2.7 ml. of a solution of 100 mg. of thionyl chloride per milliliter of pyridine are added dropwise over a two minute period. The solution is placed in an ice bath for 30 minutes and then carefully diluted with water. The crystals which separate are filtered, washed with water and dried to give 3,17-bisethylenedioxy-4α,8,14-trimethyl-18-nor-5α,8α,14β - androstane-9(11)-ene having a melting point about 106–108° C., $[\alpha]_D^{22}$ —82° (chloroform).

Analysis.—Calc'd for $C_{25}H_{38}O_4$ (402.58): C, 74.59; H, 9.52. Found: C, 74.67; H, 9.54.

*Examples 55 to 69*

Following the procedure of Example 54 but utilizing the reactants of Table F in lieu of 3,17-bisethylenedioxy-11β-hydroxy-4α,8,14-trimethyl-18-nor-5α,8α,14β - androstane, the product of Table F will be obtained.

TABLE F

| Example | Reactant | Product |
|---|---|---|
| 55 | 3,17-bisethylenedioxy-11α-hydroxy-4α,8,14-trimethyl-18-nor-5α,8α,9β,14β-androstane. | 3,17-bisethylenedioxy-4α,8,14-trimethyl-18-nor-5α,8α,14β-androst-9(11)-ene. |
| 56 | 11α-hydroxy-4α,8,14-trimethyl-18-nor-5α,8α,9β,14β-androstane-3,17-dione. | 4α,8,14-trimethyl-18-nor-5α,8α,14β-androst-9(11)-en-3,17-dione. |
| 57 | 3α-acetoxy-11α-hydroxy-4α,8,14-trimethyl-18-nor-5α,8α,9β,14β-androstane-17-one. | 3α-acetoxy-4α,8,14-trimethyl-18-nor-5α,8α,14β-androst-9(11)-en-17-one. |
| 58 | 3β-acetoxy-11α-hydroxy-4α,8,14-trimethyl-18-nor-5α,8α,9β,14β-androstane-17-one. | 3β-acetoxy-4α,8,14-trimethyl-18-nor-5α,8α,14β-androst-9(11)-en-17-one. |
| 59 | 3α-acetoxy-17-ethylenedioxy-11α-hydroxy-4α,8,14-trimethyl-18-nor-5α,8α,9β,14β-androstane. | 3α-acetoxy-17-ethylenedioxy-4α,8,14-trimethyl-18-nor-5α,8α,14β-androst-9(11)-ene. |
| 60 | 3β-acetoxy-17-ethylene-dioxy-11α-hydroxy-4α,8,14-trimethyl-18-nor-5α,8α,9β,14β-androstane. | 3β-acetoxy-17-ethylene-dioxy-4α,8,14-trimethyl-18-nor-5α,8α-androst-9(11)-ene. |
| 61 | 3α-propionyloxy-17-ethylenedioxy-11α-hydroxy-4α,8,14-trimethyl-18-nor-5α,8α,9β,14β-androstane. | 3α-propionyloxy-17-ethylenedioxy-4α,8,14-trimethyl-18-nor-5α,8α,14β-androst-9(11)-ene. |
| 62 | 3α-acetoxy-11β-hydroxy-4α,8,14-trimethyl-18-nor-5α,8α,14β-androstane-17-one. | 3α-acetoxy-4α,8,14-trimethyl-18-nor-5α,8α,14β-androst-9(11)-ene-17-one. |
| 63 | 3β-acetoxy-11β-hydroxy-4α,8,14-trimethyl-18-nor-5α,8α,14β-androstane-17-one. | 3β-acetoxy-4α,8,14-trimethyl-18-nor-5α,8α,14β-androst-9(11)-ene-17-one. |
| 64 | 3α-acetoxy-11β-hydroxy-4α,8,14-trimethyl-18-nor-5α,8α,9α,13α,14β-androstane-17-one. | 3α-acetoxy-4α,8,14-trimethyl-18-nor-5α,8α,13α,14β-androst-9(11)-en-17-one. |
| 65 | 3β-acetoxy-11β-hydroxy-4α,8,14-trimethyl-18-nor-5α,8α,9α,13α,14β-androstane-17-one. | 3β-acetoxy-4α,8,14-trimethyl-18-nor-5α,8α,13α,14β-androst-9(11)-en-17-one. |
| 66 | 3α-acetoxy-17-ethylenedioxy-11β-hydroxy-4α,8,14-trimethyl-18-nor-5α,8α,14β-androstane. | 3α-acetoxy-17-ethylene-dioxy-4α,8,14-trimethyl-18-nor-5α,8α,14β-androst-9(11)-ene. |
| 67 | 3β-acetoxy-17-ethylenedioxy-11β-hydroxy-4α,8,14-trimethyl-18-nor-5α,8α,14β-androstane. | 3β-acetoxy-17-ethylenedioxy-4α,8,14-trimethyl-18-nor-5α,8α,14β-androst-9(11)-ene. |
| 68 | 3α-acetoxy-17-ethylenedioxy-11β-hydroxy-4α,8,14-trimethyl-18-nor-5α,8α,13α,14β-androstane. | 3α-acetoxy-17-ethylenedioxy-4α,8,14-trimethyl-18-nor-5α,8α,13α,14β-androst-9(11)-ene. |
| 69 | 3β-acetoxy-17-ethylenedioxy-11β-hydroxy-4α,8,14-trimethyl-18-nor-5α,8α,13α,14β-androstane. | 3β-acetoxy-17-ethylenedioxy-11β-hydroxy-4α,8,14-trimethyl-18-nor-5α,8α,13α,14β-androstane. |

*Example 70.—3,17-bisethylenedioxy-4α,8,14-trimethyl-18-nor-5α,8α,13α,14β-androst-9(11)-ene*

Following the procdure of Example 54 but substituting 3,17 - bisethylenedioxy-11β-hydroxy-4α,8,14-trimethyl-18-nor-5α,8α,13α,14β-androstane for the 3,17-bisethylenedioxy - 11β - hydroxy - 4α,8,14-trimethyl-18-nor-5α,8α,14β-androstane, there is obtained 3,17-bisethylenedioxy-4α,8,14-trimethyl-18-nor-5α,8α,13α,14β-androst-9(11)-ene having a melting point about 121–123° C.

Analysis.—Calc'd for $C_{21}H_{30}O_3$ (330.45): C, 74.59; H, 9.52. Found: C, 74.43; H, 9.26.

*Example 71.—4α,8,14 - trimethyl - 18 - nor-5α,8α,14β-androst-9(11)-ene-3,17-dione*

Following the procedure of Example 54 but substituting 11β-hydroxy-4α,8,14-trimethyl-18-nor-5α,8α,14β - androstane-3,17-dione for 3,17-bisethylenedioxy-11β-hydroxy-4α,8,14-trimethyl-18-nor-5α,8α,14β-androstane, there is obtained 4α,8,14-trimethyl - 18 - nor - 5α,8α,14β-androst-9(11)-ene-3,17-dione.

*Example 72.—4α,8,14-trimethyl-18-nor-5α,8α,13α,14β-androst-9(11)-ene-3,17-dione*

Following the procedure of Example 54 but substituting 11β - hydroxy-4α,8,14-trimethyl-18-nor-5α,8α,13α,14β-androstane for 3,17-bisethylenedioxy-11β-hydroxy-4α,8,14-trimethyl-18-nor-5α,8α,14β-androstane, there is obtained 4α,8,14 - trimethyl-18-nor-5α,8α,13α,14β-androst - 9(11)-ene-3,17-dione.

*Example 73.—3,17-bisethylenedioxy-4α,8,14-trimethyl-18-nor-5α,8α,14β-androst-9(11)-ene*

Following the procedure of Example 54 but substituting 3,17-bisethylenedioxy-11α-hydroxy-4α,8,14 - trimethyl-18-nor-5α,8α,9β,14β-androstane for 3,17 - bisethylenedioxy-11β-hydroxy-4α,8,14-trimethyl-18-nor-5α,8α,14β - androstane, there is obtained 3,17-bisethylenedioxy-4α,8,14-trimethyl-18-nor-5α,8α,14β-androst-9(11)-ene.

*Example 74.—4α,8,14-trimethyl-18-nor-5α,8α,14β-androst-9(11)-ene*

Following the procedure of Example 54 but substituting 11α-hydroxy-4α,8,14-trimethyl-18-nor - 5α,8α,9β,14β-androstane-3,17-dione for 3,17 - bisethylenedioxy - 11β-hydroxy-4α,8,14-trimethyl - 18-nor - 5α,8α,14β - androstane, there is obtained 4α,8,14-trimethyl-18-nor-5α,8α-14β-androst-9(11)-ene.

*Example 75.—3α-acetoxy-17-ethylenedioxy - 4α,8,14 - trimethyl-18-nor-5α,8α,14β-androstane - 11 - one and 3α-acetoxy-17-ethylenedioxy-4α,8,14-trimethyl - 18 - nor-5α,8α,13α,14β-androstane-11-one*

Following the procedure of Example 15 but substituting 3α-acetoxy-4α,8,14-trimethyl-18 - nor - 5α,8α,14β-androstane-11,17-dione for 4α,8,14-trimethyl-18-nor-5α,8α,14β-androstane-3,11,17-trione, there is obtained 3α-acetoxy-17-ethylenedioxy-4α,8,14-trimethyl-18 - nor - 5α,8α,14β-androstane-11-one having a melting point about 165–167° C., [α]_D —145° C. (chloroform).

*Analysis.*—Calc'd for $C_{25}H_{38}O_5$: C, 71.74; H, 9.15. Found: C, 71.50; H, 9.21.

In addition, there is obtained 3α-acetoxy-17-ethylenedioxy-4α,8,14-trimethyl-18 - nor - 5α,8α,13α,14β - androstane-11-one having a melting point about 185–187° C.

What is claimed is:

1. A compound having the formula

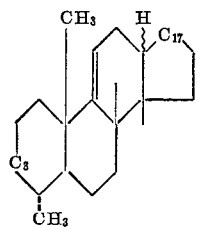

wherein $C_3$ is selected from the group consisting of C=O

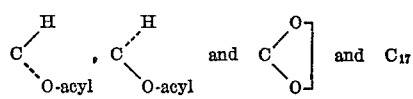

is selected from the group consisting of C=O and

wherein the acyl is a hydrocarbon carboxylic acid of less than twelve carbons.

2. 11α-hydroxy-4α,8,14-trimethyl-18-nor-5α,8α,9β,14β-androstane-3,17-dione.

3. 11β-hydroxy-4α,8,14-trimethyl-18-nor-5α,8α,14β-androstane-3,17-dione.

4. 11β-hydroxy-4α,8,14-trimethyl-18-nor-5α,8α,13α,14β-androstane-3,17-dione.

5. A compound having the formula

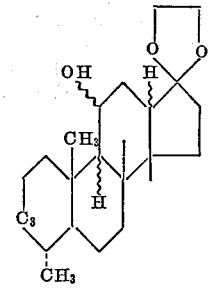

wherein $C_3$ is selected from the group consisting of C=O

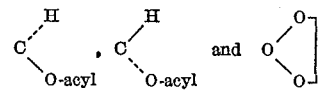

wherein the acyl is a hydrocarbon carboxylic acid of less than twelve carbons.

6. 3,17-bisethylenedioxy-11α-hydroxy-4α,8,14-trimethyl-18-nor-5α,8α,9β,14β-androstane.

7. 3α-acetoxy-17-ethylenedioxy-11α-hydroxy - 4α,8,14-trimethyl-18-nor-5α,8α,9β,14β-androstane.

8. 3β-acetoxy-17-ethylenedioxy-11α-hydroxy - 4α,8,14-trimethyl-18-nor-5α,8α,9β,14β-androstane.

9. 3α-acetoxy-17-ethylenedioxy-11β-hydroxy - 4α,8,14-trimethyl-18-nor-5α,8α,14β-androstane.

10. 3β-acetoxy-17-ethylenedioxy-11β-hydroxy - 4α,8,14-trimethyl-18-nor-5α,8α,14β-androstane.

11. 3α-acetoxy-17-ethylenedioxy-11β-hydroxy - 4α,8,14-trimethyl-18-nor-5α,8α,13α,14β-androstane.

12. 3β-acetoxy - 17 - ethylenedioxy - 11β - hydroxy-5α,8α,13α,14β-androstane.

13. 3,17-bisethylenedioxy - 11β - hydroxy - 4α,8,14-trimethyl-18-nor-5α,8α,14β-androstane.

14. 3,17-bisethylenedioxy - 11β - hydroxy - 4α,8,14-trimethyl-18-nor-5α,8α,13α,14β-androstane.

15. A compound having the formula

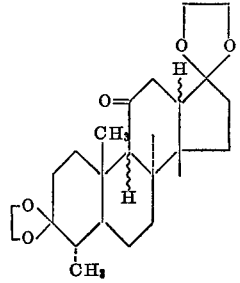

16. A compound having the formula

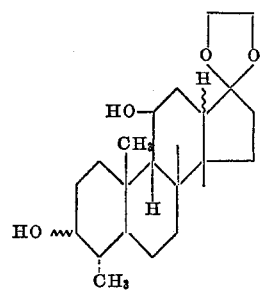

17. 17-ethylenedioxy - 3α,11β - dihydroxy - 4α,8,14-trimethyl-18-nor-5α,8α,13α,14β-androstane.

18. 17-ethylenedioxy - 3β,11β - dihydroxy - 4α,8,14-trimethyl-18-nor-5α,8α,13α,14β-androstane.

19. 17-ethylenedioxy - 3α,11β - dihydroxy - 4α,8,14-trimethyl-18-nor-5α,8α,14β-androstane.

20. 17-ethylenedioxy - 3β,11β - dihydroxy - 4α,8,14-trimethyl-18-nor-5α,8α,14β-androstane.

21. 17-ethylenedioxy - 3β,11α - dihydroxy - 4α,8,14-trimethyl-18-nor-5α,8α,9β,14β-androstane.

22. 3α-acetoxy-17-ethylenedioxy - 4α,8,14 - trimethyl-18-nor-5α,8α,14β-androstane-11-one.

23. 3α-acetoxy-17-ethylenedioxy - 4α,8,14 - trimethyl-18-nor-5α,8α,13α,14β-androstane-11-one.

24. 3β-acetoxy-17-ethylenedioxy - 4α,8,14 - trimethyl-18-nor-5α,8α,14β-androstane-11-one.

25. 3β-acetoxy-17-ethylenedioxy - 4α,8,14 - trimethyl-18-nor-5α,8α,13α,14β-androstane-11-one.

References Cited

Bucourt et al., "Comptes Rendus de l'Acadamie des Sciences," vol. 258 (1964) pp. 3491–3494.

ELBERT L. ROBERTS, *Primary Examiner*.

UNITED STATES PATENT OFFICE
CERTIFICATE OF CORRECTION

Patent No. 3,352,854                          November 14, 1967

Patrick A. Diassi et al.

It is hereby certified that error appears in the above numbered patent requiring correction and that the said Letters Patent should read as corrected below.

Column 1, lines 28 to 31, for

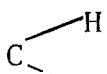          read          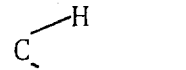

column 2, line 29, for "deactoxylating" read -- deacetoxylating --; column 5, lines 35 to 44, formula V should appear as shown below instead of as in the patent:

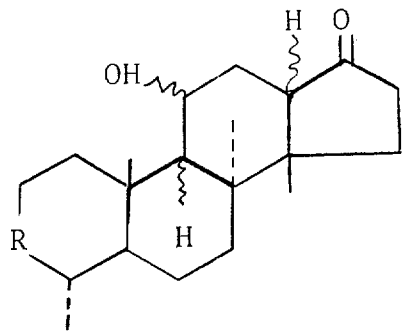

same column 5, lines 64 to 66, for

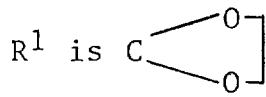          read          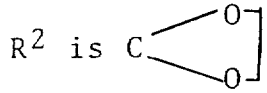

column 6, line 20, for "3α," read -- 3β, --; line 21, for "13β," read -- 13α, --; column 12, line 63, for "procdure" read -- procedure --; column 14, lines 20 to 23, for

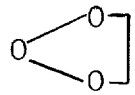          read          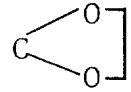

Signed and sealed this 11th day of March 1969.

(SEAL)
Attest:

EDWARD M. FLETCHER, JR.                  EDWARD J. BRENNER
Attesting Officer                        Commissioner of Patents